United States Patent [19]

Haerle

[11] Patent Number: 5,179,061
[45] Date of Patent: Jan. 12, 1993

[54] FILTER OR CATALYST BODY

[76] Inventor: Hans A. Haerle, Roettinger Strasse 38, D-7085 Bopfingen, Fed. Rep. of Germany

[21] Appl. No.: 729,432

[22] Filed: Jul. 12, 1991

[30] Foreign Application Priority Data

Jul. 19, 1990 [DE] Fed. Rep. of Germany ....... 4022937

[51] Int. Cl.⁵ ..................... B01J 35/06; B01D 39/06; B01D 39/08
[52] U.S. Cl. ..................... 502/339; 502/325; 502/353; 502/439; 502/527; 55/487; 55/512; 55/523; 55/524; 55/525; 55/527; 55/528
[58] Field of Search ................. 55/487, 512, 523, 524, 55/525, 527, 528; 502/439, 527, 325, 339, 353

[56] References Cited

U.S. PATENT DOCUMENTS

| | | | |
|---|---|---|---|
| 2,267,918 | 12/1941 | Hildabolt | 29/189 |
| 3,087,233 | 4/1963 | Turnbull | 29/182 |
| 3,161,478 | 12/1964 | Chessin | 29/191.2 |
| 3,306,353 | 2/1967 | Burne | 165/164 |
| 3,904,551 | 9/1975 | Lundsager et al. | 252/477 R |
| 3,956,192 | 5/1976 | Nicolai | 502/527 X |
| 4,062,807 | 12/1977 | Suzuki | 253/443 |
| 4,064,914 | 12/1977 | Grant | 138/142 |
| 4,301,012 | 11/1981 | Puckett | 210/457 |
| 4,329,162 | 5/1982 | Pitcher, Jr. | 55/523 |
| 4,515,758 | 5/1985 | Domesle et al. | 423/213.2 |
| 4,652,286 | 3/1987 | Kusuda et al. | 55/523 |
| 4,662,915 | 5/1987 | Shirai et al. | 55/511 |
| 4,687,579 | 8/1987 | Bergman | 210/347 |
| 4,725,411 | 2/1988 | Cornelison | 422/180 |
| 4,732,593 | 3/1988 | Kondo et al. | 55/52.3 |
| 4,758,272 | 7/1988 | Pierotti et al. | 75/246 |
| 4,760,047 | 7/1988 | Jeschke et al. | 502/439 |
| 4,889,630 | 12/1989 | Reinhardt et al. | 210/490 |
| 4,971,769 | 11/1990 | Haerle | 422/171 |
| 4,981,172 | 1/1991 | Haerle | 165/133 |
| 4,983,193 | 1/1991 | Tani et al. | 55/528 X |
| 5,009,857 | 4/1991 | Haerle | 422/180 |
| 5,057,482 | 10/1991 | Fukuda et al. | 502/527 X |

FOREIGN PATENT DOCUMENTS

| | | |
|---|---|---|
| 42301 | 12/1981 | European Pat. Off. . |
| 3901609 | 7/1990 | Fed. Rep. of Germany . |
| 3937809 | 5/1991 | Fed. Rep. of Germany . |
| 1453653 | 8/1966 | France . |
| 2462188 | 2/1981 | France . |
| 54-128842 | 10/1979 | Japan . |
| 54-152241 | 11/1979 | Japan . |
| 61-287451 | 12/1986 | Japan . |
| 62-225221 | 10/1987 | Japan . |

Primary Examiner—W. J. Shine

[57] ABSTRACT

A filter or catalyst body comprising wires or fibers is disclosed which is constructed in a single-layer or multi-layer as woven cloth, braiding or knitted fabric, the wires or fibers being at least partially connected to one another by sintering or welding. The woven cloth, netting, braiding or knitted fabric is endowed with inserted powdery, granular or chip-like particles which are sintered with or welded to the wires or fibers to provide a filter density which is lower in the inlet region of the filter body since fewer particles are provided there.

21 Claims, 1 Drawing Sheet

FILTER OR CATALYST BODY

BACKGROUND OF THE INVENTION

This invention relates to a filter or catalyst body comprising wires or fibers which are constructed in one or several layers as a woven cloth, braiding (netting or mesh) or knitted fabric, with the wires or fibers being at least partially connected to one another by sintering or welding.

Filters and catalyst bodies consisting of several layers or plies of woven cloths, braiding or knitted fabrics made from metal fibers or metal wires which have been sintered together, are already known.

Filters of this type are used as socalled drop base filters, with the separation of the medium to be filtered occurring on the surfaces of the multilayer woven cloth, braiding or knitted fabric, or its constituents. The efficiency of the filter is limited by the available surface.

Such filters may also be used as catalysts, e.g. for cleaning exhaust gases from internal combustion engines in motor vehicles. Here too, the largest possible surfaces are required to allow an exchange of electrons to occur.

Catalytically effective materials, such as platinum, rhodium or vanadium, for example, are accordingly used as catalysts.

Soot filters for diesel engines, which are usually made of ceramic material, are also known. The hot engine exhaust gases are conveyed through the ceramic filter body, and in the porous channels together with the prevailing higher temperatures, the soot, i.e. carbon, is converted in the filter walls of the filter body into gas and ash. Apart from ceramic filter bodies, filter bodies made of other filter materials, such as sintered materials made from metal, have also been previously proposed.

However the known filters and catalysts have the disadvantage that their separation surfaces are limited. For this reason a relatively large number of layers of woven cloths or knitted fabrics are required, with it being possible for the thicknesses to be between a few millimeters and several meters according to each case.

In the prior West German application P 39 08 581.3 a process for the manufacture of a catalyst body and a catalyst, in which powdery or granular particles are sintered onto the individual layers or their components, has already been proposed.

In this way, a multiple surface enlargement is achieved, with which a much higher absorption surface and, consequently, a considerably larger filter surface becomes available. Thus, a clear reduction in size of the filter is obtained with the same filter capacity or a clearly higher filter capacity, is achieved with the same size of filter.

The object of the invention is to improve even further a filter or catalyst body of this type with respect to its efficiency and, in particular, its filter capacity.

SUMMARY OF THE INVENTION

This object is achieved as specified by the invention in that the woven cloth, braiding or knitted fabric is endowed with inserted powdery, granular or chip-like particles, which are sintered with the wires or fibers, to at least partially connect the wires or fibers with the filter density being less in the inlet region of the filter body as fewer particles are provided there.

A type of preliminary filter is expediently created by varying the filter density, and in particular, by having a reduced filter density in the inlet region. In the course of the normal filter operation, this inlet region becomes clogged of the surface on the inlet side. A filter cake is expediently produced on the filter surface, which inter alia produces a higher back pressure. This means that when used as an exhaust gas filter for an internal combustion engine, the engine power becomes correspondingly lower.

By the formation of the preliminary filter specified by the invention, a clearly greater dispersion of impurities to be separated is surprisingly created in the filter. The unavoidable filter cake surface becomes larger, as it can penetrate deeper into the filter body because the filter density is less. In this way there is a clearly higher filter surface on the inlet side and, thus, also a higher storage capacity. Consequently, the filter does not become completely clogged up so quickly and there is also a smaller back pressure.

In addition a further advantage is that the filter specified by the invention is cheaper to manufacture with the same capacity, as less material is required.

In a possible development, it may also be specified that the filter density in the outlet region decreases again because fewer particles are provided.

With this development, the back pressure produced by the filter is reduced without any notable impairment of the efficiency of the filter. In this way, it is possible for the cleaned exhaust gases to flow away more easily.

The wires and fibers, respectively, can be made from metal, plastic, ceramics or mixtures thereof. If necessary, other materials are also possible.

Particles of metal, plastic, ceramics or mixtures thereof, for example, may be used as particles which are placed in the woven cloth, braiding or knitted fabric.

If the filter is provided as a catalyst, catalytically effective materials, such as, for example, platinum, rhodium or vanadium, may be used to remove or convert carbon monoxide, hydrocarbons and nitrogen oxides.

When the filter is used as a soot filter, manganese, molybdenum or the like, which improve the soot conversion, may be used.

A material which can be sintered, such as, for example, sintered metal may advantageously be used as the basic material for the woven cloth, braiding or knitted fabric. If particles which can be sintered are also used, then the metal fibers, metal wires and the particles can advantageously be sintered to one another in a single sintering operation. In contrast with conventional filters, there results a large-scale sintering process, i.e. with greater contact surfaces, as a result of which the filter body also has greater strength.

An exemplified embodiment of the invention is described in principle below by means of the drawings.

DESCRIPTION OF THE PREFERRED EMBODIMENTS

Figure 1:
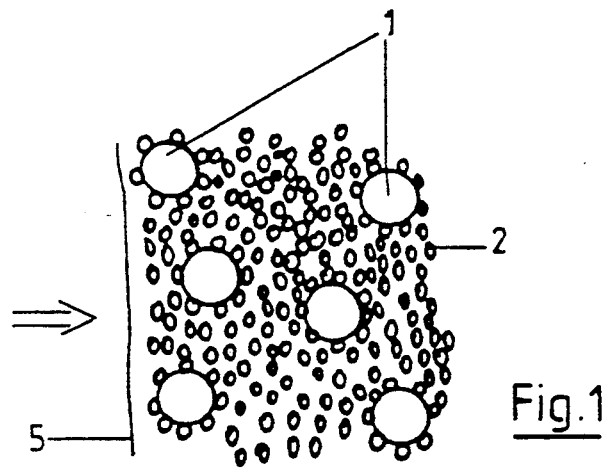
FIG. 1 shows a filter of known design.

The known filter shown in FIG. 1 is made of metal wires 1, which are respectively connected to one another either regularly or irregularly as braiding (netting or mesh), knitted fabric or woven cloth or in layers, for example.

Between the wires, which are made from sintered metal, for example, are inserted smaller particles 2 in the form of powder, grains or in chip form.

The insertion of the particles in the woven cloth, braiding or knitted fabric may be performed in various ways. Thus they can be inserted by an adhesive liquid, for example. They can also be inserted by shaking in, by an electric and/or magnetic charging, and the like.

When using materials which can be sintered, the filter body may subsequently be manufactured in a single operating cycle.

Figure 2:
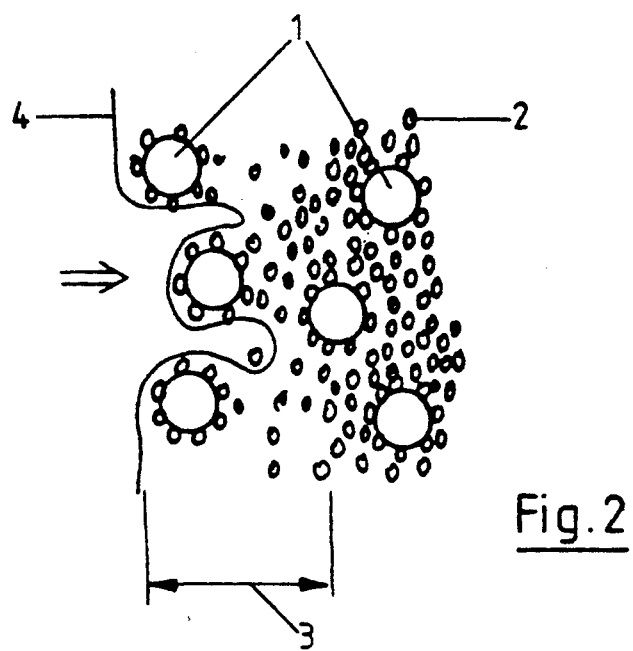
FIG. 2 shows the filter specified by the invention with a preliminary filter.

The process described in the prior West German Patent Application P 39 08 581.3 is modified according to the exemplified embodiment shown in FIG. 2 in that the provision or insertion of the particles 2 in the woven cloth, braiding or knitted fabric of wires 1 occurs so that fewer particles are provided in an inlet region 3 of the filter body. For this purpose reference is made to the region shown in FIG. 2 by the arrows. In this way a type of preliminary filter is created in the inlet region, with the filter density being small as a function of the medium to be cleaned so that the unavoidable filter cake formed from the impurities to be separated still partly penetrates into the filter body itself, i.e. into the inlet region 3. The course of the surface of the filter cake is represented by line 4 in FIG. 2. As can be seen, the surface obtained as a result is substantially larger than the filter surface in the known filter body shown in FIG. 1, which is represented by line 5.

The filter density may be less in the outlet region (not shown) as in the inlet region 3 because of a correspondingly smaller allocation of particles 2.

I claim:

1. A filter or catalyst body comprising wires or fibers constructed in one or several layers as woven cloth, braiding or knitted fabric, with the wires or fibers being at least partially connected to one another by sintering, said body containing inserted powdery, granular, or chip-like particles which are sintered with the wires or fibers, and said body having a lower filter density in the inlet region of the body than in other regions of the body by the provision of fewer particles in said inlet region than in said other regions.

2. A filter or catalyst body according to claim 1 wherein the filter density increases from the inlet region in the direction of filtration by an increase in the allocation of particles along said direction of filtration.

3. A filter or catalyst body according to claim 1 wherein the woven cloth, braiding or knitted fabric comprises a metal.

4. A filter or catalyst body according to claim 1 wherein the woven cloth, braiding or knitted fabric comprises a ceramic.

5. A filter or catalyst body according to claim 1 wherein the woven cloth, braiding or knitted fabric comprises a plastic.

6. A filter or catalyst body according to claim 1 wherein the woven cloth, braiding or knitted fabric is selected from the group consisting of a mixture of metal and ceramic, a mixture of metal and plastic, a mixture of ceramic and plastic, and a mixture of metal, ceramic and plastic.

7. A filter or catalyst body according to claim 1 wherein the particles comprise metallic materials.

8. A filter or catalyst body according to claim 1 wherein the particles comprise a plastic.

9. A filter or catalyst body according to claim 1 wherein the particles comprise a ceramic.

10. A filter or catalyst body according to claim 1 wherein the particles have a composition selected from the group consisting of a mixture of metal and ceramic, a mixture of metal and plastic, a mixture of ceramic and plastic, and a mixture of metal, ceramic and plastic.

11. A filter or catalyst body according to claim 1 wherein the woven cloth, braiding or knitted fabric and the particles comprise catalytic materials.

12. A filter or catalyst body according to claim 11 wherein the catalytic materials are selected from the group consisting of platinum, vanadium and rhodium.

13. A filter having a filter body comprising a plurality of braided layers including wires or fibers at least partially connected to one another, said body containing a plurality of inserted particles which are fixedly attached to the braided layers, and said body having a lower filter density in the inlet region of the filter body than in other regions of the body by the provision of fewer particles in said inlet region than in said other regions.

14. A filter according to claim 13 wherein the filter density increases from the inlet region in the direction of filtration by an increase in the allocation of particles along said direction of filtration.

15. A filter according to claim 13 wherein said braided layers are at least partially connected to one another by sintering.

16. A filter according to claim 13 wherein said particles are fixedly attached to said braided layers by sintering.

17. A filter according to claim 13 wherein said braided layers are fabricated from materials selected from the group consisting of metals, ceramics, plastics, and mixtures thereof.

18. A filter according to claim 13 wherein said particles comprise a material selected from the group consisting of metals, ceramics, plastics, and mixtures thereof.

19. A filter according to claim 13 wherein said braided layers comprise catalytic material.

20. A filter according to claim 13 wherein said particles comprise catalytic material.

21. A filter having a filter body comprising a plurality of braided layers including wires or fibers at least partially connected to one another, said body containing a plurality of inserted particles which are fixedly attached to the braided layers, and said body having a higher filter density in the inlet region of the filter body than in other regions of the body wherein the filter density decreases in the outlet region of said filter body with a decrease in the allocation of particles in said outlet region.

* * * * *